Oct. 28, 1952 T. C. POULTER 2,615,522
SEISMIC EXPLORATION EMPLOYING ELEVATED CHARGES
Filed July 2, 1949 5 Sheets-Sheet 1

Inventor
*Thomas C. Poulter*

Oct. 28, 1952 T. C. POULTER 2,615,522
SEISMIC EXPLORATION EMPLOYING ELEVATED CHARGES
Filed July 2, 1949 5 Sheets-Sheet 3

_FIG.7

_FIG.8

Inventor
Thomas C. Poulter
Carlson, Pitzner, Hubbard & Wolfe
attys

Oct. 28, 1952 T. C. POULTER 2,615,522
SEISMIC EXPLORATION EMPLOYING ELEVATED CHARGES
Filed July 2, 1949 5 Sheets-Sheet 4

Inventor
Thomas C. Poulter

Patented Oct. 28, 1952

2,615,522

UNITED STATES PATENT OFFICE 2,615,522

SEISMIC EXPLORATION EMPLOYING ELEVATED CHARGES

Thomas C. Poulter, Palo Alto, Calif., assignor to Institute of Inventive Research, San Antonio, Tex., a trust estate of San Antonio Application July 2, 1949, Serial No. 102,821

8 Claims. (Cl. 181—0.5)

The present invention relates to geophysical exploration and more particularly to the setting up of an improved seismic wave.

It is a general object of the present invention to provide an improved method and apparatus for generating a seismic wave in which the frequency characteristics and directive nature of the wave front is such as to enable efficient transmission through the earth. More specifically, it is an object of the invention to provide a procedure for setting up a seismic wave having a frequency which may be varied to accommodate the widely different natural frequencies of the earth encountered in various regions and in which the shape of the wave front is substantially flat over a broad but well-defined area.

It is another object of the invention to provide improved means for imparting energy to the surface of the earth at a low intensity so that the resulting seismic wave may penetrate the granular material of the earth's crust yet at such a high level of total energy that the wave persists at reliable recording intensities even after reflection from great depths.

It is a further object to provide an array of air-fired charges in which a sustained pressure pulse is applied to the earth simultaneously over the entire region covered by the array with only minor variations in maximum pressure between the charges. It is a related object to produce a pressure pulse on the earth whose duration is related in a novel manner to the natural period of earth vibration. It is a more detailed object to produce a pulse of positive pressure followed by vacuum with the duration of vacuum additionally coordinated with the desired period of the seismic wave to be transmitted.

It is another object of the invention to provide an improved air-fired explosive charge which is capable, particularly when used in an array with other charges of similar nature, of applying a well defined pressure pulse to the surface of the earth and setting up an improved seismic wave therein. It is a more detailed object to provide an air-fired charge array eliminating the necessity for shot holes, which is free of danger to personnel, and which does not create a fire hazard. It is an object related to the foregoing to provide an array which does not cause alteration of or damage to the earth's surface or damage to nearby structures due to ground roll, and, when used over water, does not harm fish or other marine life.

It is yet another object to provide a charge assembly and procedure for using the same to obtain reflections from a limited area of submerged horizon and capable of producing clearcut traces free of distortion and extraneous vibration permitting easy interpretation.

Other objects and advantages of the invention will become apparent as the discussion proceeds taken in connection with the accompanying drawing, in which.

While the invention is susceptible of various modifications, I have shown in the drawings and will herein describe in detail only certain embodiments of the invention. It is to be understood, however, that I do not intend to limit the invention by such disclosure, but aim to cover all modifications and alternative devices and methods falling within the spirit and scope of the invention as expressed in the appended claims.

Figure 1:
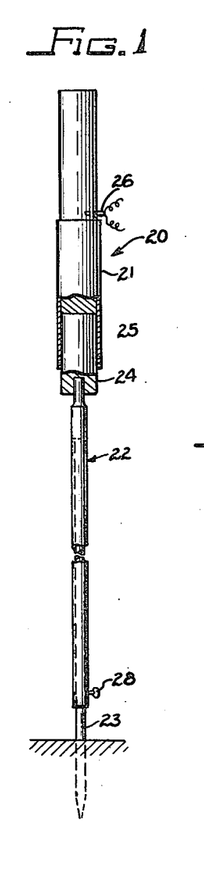
Figure 1 is an elevational view in partial section of a preferred form of charge assembly constructed in accordance with the present invention.

Referring now to Figure 1 there is shown at 20 a preferred form of charge assembly utilized in the present invention including a cylindrical explosive charge 21 supported above the surface of the earth on a tubular post 22. The charge is preferably circular in cross section and elongated, having a length in the range of about 6 to 20 times the diameter, and composed of high velocity explosive such as TNT, RDX, seismograph gelatin, or the like. Interposed between the post 22 and the charge 21 is a supporting block 24 which may be constructed of wood or similar material. This block is preferably of a diameter which corresponds to that of the charge so that they may be held together as a unit by a cardboard coupling sleeve 25. As will later appear the block 24 in addition to supporting the charge tends to act as a shield to inhibit the high intensity shock wave front which is initially propagated from the lower end of the charge upon detonation thereof. This shielding effect is particularly noticeable when the block is in direct and over-all contact with the lower end of the charge. The height of the charge above the earth may be adjusted by receiving within the post 22 a lengthy steel stake 23 and by providing a thumb screw 28 or the like to hold the members in a desired extended position.

Figure 2:
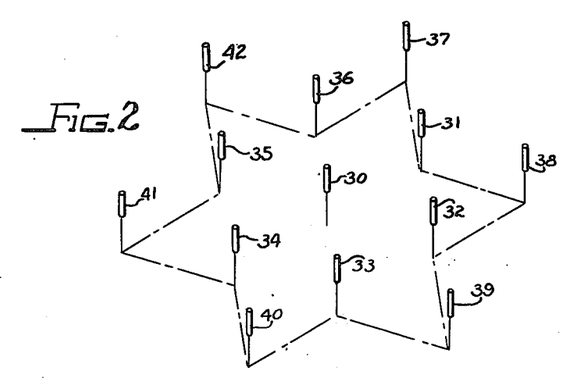
Fig. 2 is a perspective view showing the thirteen-charge pattern employed in the invention.
Figures 3, 4:
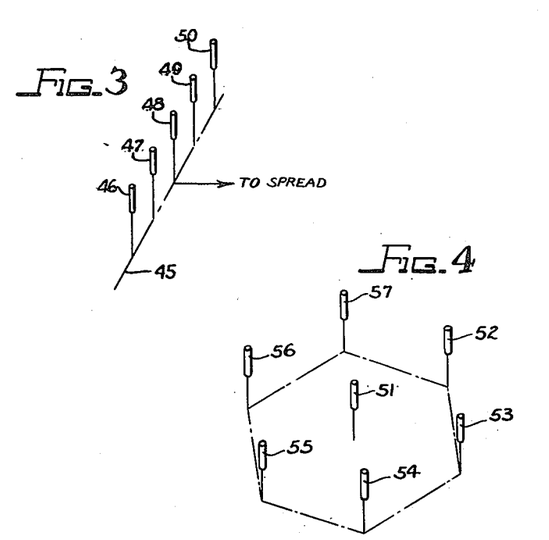
Fig. 3 shows a pattern in which the charges are arranged along a line which is perpendicular to the direction of the geophone spread.
Fig. 4 shows a pattern on the order of Fig. 2 but composed of seven charges.

In practicing the invention charges such as that shown in Fig. 1 are oriented vertically above the earth laterally spaced from one another and fired simultaneously, preferably by means of a cap located at the central portion of each of the charges. The cap indicated at 26 may be a standard seismograph cap capable of being fired in series with similar caps from a high capacity current source. One arrangement of cylindrical charges which has been found to give seismograph traces which are easily interpreted and of reliable recording intensity is shown in perspective in Fig. 2, the charges 30-42 being arranged in the form of a 6-pointed star. As we shall presently see it is desirable in some cases for the charge to be arranged as shown in Fig. 3 along a line 45 which is perpendicular to the direction to the geophone spread. The charges in this figure are designated 46-50 respectively. Or, if desired, a hexagonal pattern of seven charges 51-57 may be employed as shown in Fig. 4.

In using any of the above patterns the charges are elevated a relatively short distance above the surface of the earth and fired simultaneously. By a short distance is meant a distance such that the earth may be acted upon by the gaseous products of combustion to effect a pistonlike downward thrust over a broad but well-defined area and without any shattering of earth structure. Preferably the charges are uniformly elevated to a height in the range of about 6 up to 15 or even 20 feet, depending to some extent on the amount of explosive included in each of the charges. Under average conditions an elevation of 8 feet to 12 feet will be found most suitable. The lateral spacing of the charges will depend upon a number of factors to be discussed. The spacing in any event should be such that the wave fronts and the expanding gaseous product produced by the explosion of the respective charges may merge into one before the bulk of the gas can escape upwardly into the atmosphere. Spacings of 10 to 30 feet have been used successfully and under some conditions even greater spacings may be used as long as the above condition is substantially satisfied.

The manner in which a cylindrical charge sets up an expanding wave front when fired from the center is shown in the elapsed time views in Figs. 5a to 5e inclusive which cover a typical case in which the total interval is .0360 second. These views are based on measurements made with air pick-up devices distributed about the charge and have been confirmed by high speed motion pictures taken at a speed of 3000 frames per second. The charges 46-50 are alined as shown in the pattern of Fig. 3, although substantially the same conditions hold true for adjacent charges in other specific patterns. It is found that the horizontal velocity of the laterally advancing air wave is more than twice the vertical velocity, and the velocity at an angle of 30° upwardly or downwardly from the horizontal plane passing through the center of the charge is appreciably faster than the velocity in the horizontal plane. This is clearly indicated in Fig. 5c. Each charge therefore tends to generate an expanding pressure wave front in the form of a flattened cylinder somewhat rounded top and bottom. This wave front will normally start out as a high velocity shock wave but, depending upon the detonation rate of the explosive, may decrease to near sonic velocity before collision takes place.

In addition to the reinforcement of pressure which takes place when the wave fronts collide, the shape of the wave front advancing into contact with the surface of the earth is significant. As will be seen in the Figures 5c-5e inclusive, the wave front tends to become flatter and flatter in the interval from .001 second to .005 second. This is due to the fact that the colliding wave fronts cause the velocity in the direction of the earth to be increased to the point where the wave front in this region "catches up with" the wave front in the region directly below each of the charges. Or, stated another way, the high lateral velocity of the wave front resulting from the particular charges plus the added downward impetus caused by the collision compensates rather closely for the additional distance traversed by the wave in the intermediate regions. The net effect is that the merged wave front thus entraps a rather uniform layer of air 58 and compresses it against the earth over an appreciable area. This occurs during the interval between Figs. 5c and 5e.

Figure 5A:
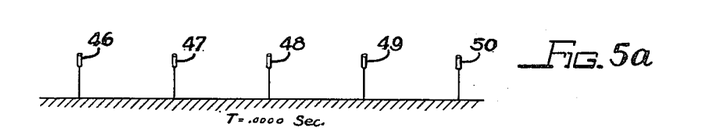
Figs. 5a–5e are a senquence of views showing the formation of a pressure pulse from a pattern of charges of the type illustrated in Fig. 1.
Figure 5B:
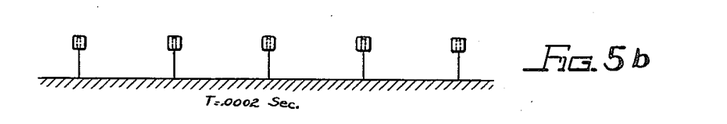
Figure 5C:
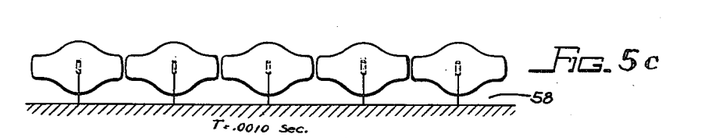
Figure 5D:
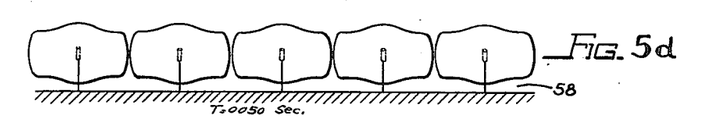
Figure 5E:
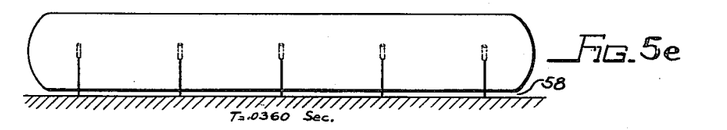

In Fig. 5e the wave front which applies the pressure pulse to the earth is shown as substantially plane. As a practical matter the wave front produced may have surface irregularities. This does not necessarily mean that the seismic wave front set up in the earth will be correspondingly irregular for a number of reasons. In the first place the pulse on the earth persists sufficiently and there is enough turbulence in the products of combustion following the wave front so that minor irregularities tend quickly to average out. It is noteworthy that regardless of the direction of motion of gases above or in contact with the surface of the earth in building up the pressure, any force on the earth is always exerted normal to the surface and hence the wave motion starts at the surface without horizontal component which is always associated with the detonation of a charge in a shot hole.

Even more important, however, it has been found that if the wave front in the earth includes leading portions lying in a plane, it tends to become increasingly plane as it progresses through the earth. This was confirmed by tests in which charges were fired at a twenty foot spacing with geophones buried in the earth at a depth of only twenty feet both directly under the charges and at intervening points. No difference in phasing could be detected.

Figures 6, 9, 10:
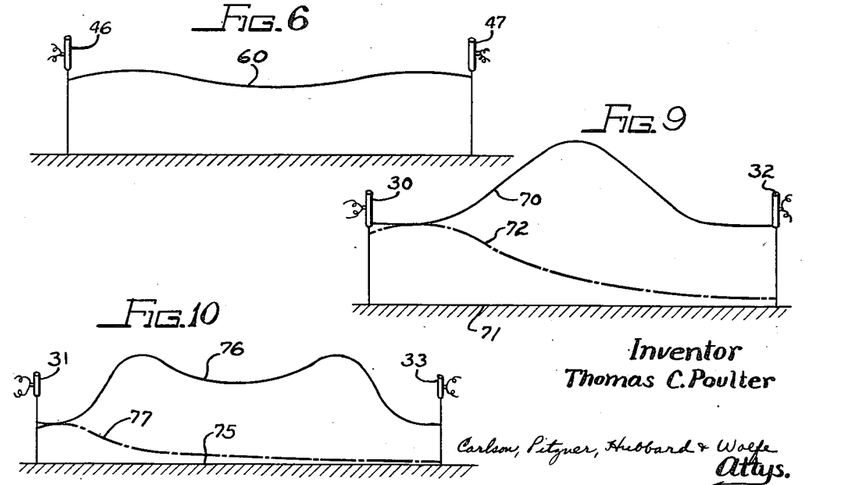
Fig. 6 is a plot of maximum pressure at the earth between two charges fired simultaneously.
Fig. 9 is a plot of maximum pressure between two of the charges in the pattern of Fig. 7.
Fig. 10 is similar to Fig. 9 but shows the variation in maximum pressure between two charges at right angles to the charges of Fig. 9.
Figure 7:
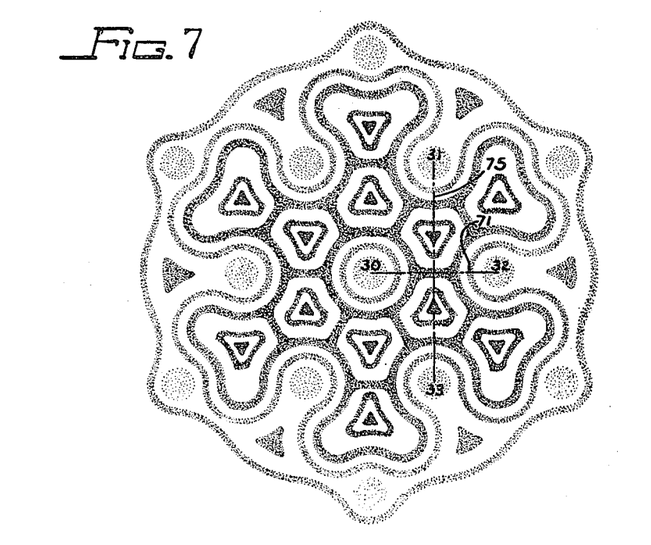
Fig. 7 is a plan view of a pattern of thirteen charges showing the distribution of maximum pressure in the pattern where the spacing between charges is on the order of 10 to 20 feet.
Figure 8:
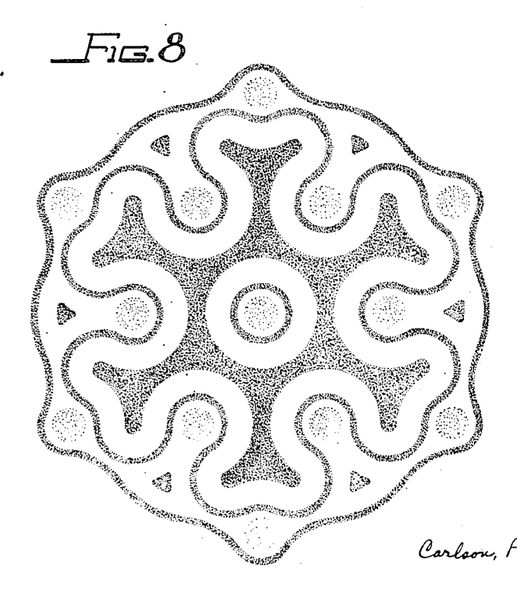
Fig. 8 is a plan view similar to Fig. 7 for a charge spacing of about 30 feet.

Having considered the shape of the wave front attention may next be given to the distribution of pressure therein. It might be expected that the pressure applied to the earth would be much greater at points directly under the individual charges than at intermediate points. However, pressure measurements taken at spaced points between adjacent charges, for example with charges 46, 47 in Fig. 3 produce a maximum pressure curve 60 shown in Fig. 6. It will be seen that the pressure at the mid point between adjacent charges is substantially the same as at a point directly below the charges. This effect is even more pronounced where the charges are arranged at a two-dimensional pattern such as the star pattern shown in Fig. 2. In order to show the distribution of maximum pressure in the larger pattern, the pressure set up by the charges 30–42 are shown in plan view of Figs. 7 and 8. Fig. 7 shows the distribution of pressure using a charge spacing of 10 to 20 feet, while Fig. 8 shows the distribution at a spacing of approximately 30 feet. Each of these figures is stippled with the density being roughly proportional to the maximum pressure. The intermediate areas represent intermediate pressures. That the maximum pressure is even higher at a point midway between the charges than it is right under the charges is further brought out by Figs. 9 and 10. In Fig. 9 the variations of pressure at the ground along a line 71 connecting adjacent charges is given by a curve 70. The magnitude of the piston-like thrust of expanding gas may be brought out by a comparison of the curve 70 with the dotted curve 72 which shows the variation of maximum pressure with distance for a single isolated charge. It will be noted that the pressure at the mid point of curve 70 which corresponds to a radial distance of about 10 feet is about five and one-half times the pressure which is produced on the earth at the same distance by a singly fired charge. Pressure measurements were also made along a line connecting two of the charges lying at right angles to the line 71 (see Fig. 7). This line has been designated 75 and the pressure curve corresponding thereto is designated 76 in Fig. 10. The latter curve has a double hump showing that there are two regions of maximum pressure. The ordinate scale is about half that of Fig. 9. Here again comparison may be made with a pressure curve 77 resulting from the firing of a single isolated charge. At some distance from the charge the pressure resulting from firing the charges in a pattern is seven or more times that which is observed upon firing a single charge.

The reason for higher pressures in Fig. 10 than in Fig. 9 will be apparent when it is noted that the high pressure region results from the meeting of wave fronts from three charges, namely 30, 31, 32 and 30, 32, 33. The buildup of pressure at points located between adjacent charges is indicated not only on instruments but also by the condition of the earth after a shot. It is found that surface debris and vegetation show evidence of greater derangement at the regions of higher pressure. To sum up, the disclosed arrangement of cylindrical charges produces an expanding gas mass which is applied to the earth flatly over a large area with a disproportionately high average pressure over such area. The regions of maximum pressure, as we have noted, are not around the charges as might be expected, but at points in the pattern most widely removed therefrom. While more will be said of the "sustained" nature of the pulse in the paragraphs which follow, the duration is, nevertheless short enough so that the atmospheric air blanket constitutes a temporary barrier to the gas tending to escape upwardly. Measurements indicate that the total force applied to the earth amounts to about 2,000,000 pounds per pound of explosive. This relation seems to hold not only for a total weight of explosive on the order of 25 pounds which would be used in the practical case but also when the total charge is several times as great.

Figure 11:
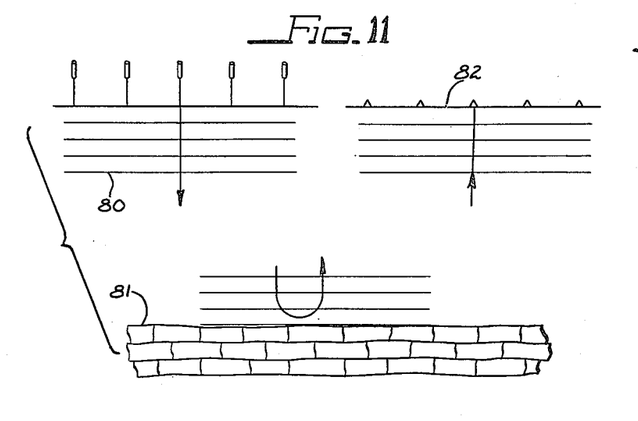
Fig. 11 shows schematically the propagation of a flat wave front through the earth.

After an explosion the wave front set up in the earth is flatly transmitted through the loose weathered layer, successive positions being indicated at 80 in Fig. 11. After the weathered layer is penetrated it is true that a certain amount of fringing takes place causing the wave front to become spherical, but by this time the radius of curvature is so great that the wave for all practical purposes may be said to remain flat. After reflection from a submerged horizon 81 the wave is received at a spread of geophones 82 which is located in the present illustrative embodiment at a sufficient distance so that all the desired reflections are received prior to the reception of the airborne wave. Ordinarily this distance need not exceed one-quarter to one-half mile and may be much less if only shallow reflections are of interest.

In accordance with one of the aspects of the invention, the positive pulse of pressure applied to the earth and the tug of vacuum which follows immediately thereafter are coordinated in a novel manner with the natural period of the earth. More specifically, the charges are so proportioned and arranged that a pulse of positive pressure persists for a period which is substantially equal to one-quarter of the period of the wave motion most readily transmitted by the earth in the region under consideration. In order to more fully understand this aspect of the invention, attention is now directed to Fig. 12 which shows the variation of pressure at the earth as a function of time.

At the instant of detonation the pressure at the surface rises abruptly from zero to a rather high value indicated at 85 which may be on the order of 180 pounds per square inch. It might be expected that the pressure particularly in the region lying directly below the charge would soar to a high peak value because of the shock wave and then immediately drop off to a much lower value. On the contrary, when charges and spacings are used as disclosed herein, the high velocity shock wave is prevented from passing directly downward to reduce the sharpness of the peak and the pressure is sustained at a rather constant high value. Under normal conditions the pressure may even rise slightly to a second peak 86. The pressure subsequently drops to atmospheric as shown at 87 and then below atmospheric along the portion 88 reaching atmospheric pressure again at 89. The net effect is to produce a positive pressure which exists over a clearly defined time interval immediately followed by vacuum over a somewhat longer time interval. My observations indicate that the sustained pressure is due to the collision between the wave fronts and the interaction of the gas masses set up by adjacent charges as previously alluded to in connection with Figs. 5a–5e. The vacuum is apparently due to the inertia of the air set in motion above the pattern and around its periphery.

Figure 12:
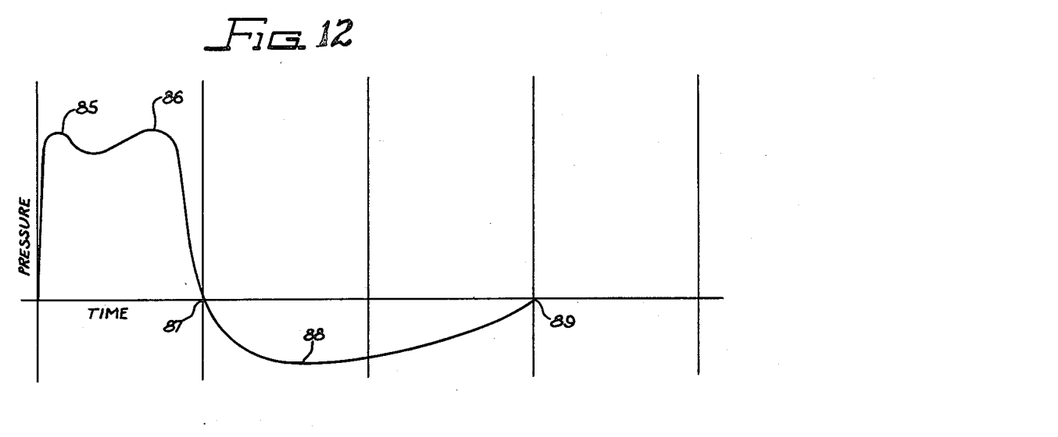
Figs. 12 and 12a show the pressure applied to the earth as a function of time and the approximate variation of earth displacement and velocity which results therefrom.
Figure 12A:
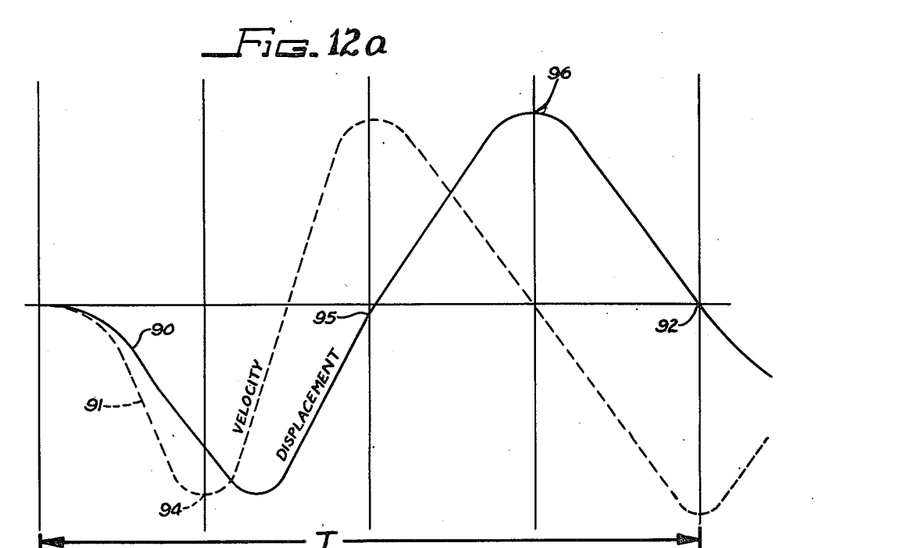

The manner in which the pressure wave is coordinated with the natural period of the earth will be apparent upon a comparison of Fig. 12 with the curves of earth displacement and velocity shown in Fig. 12a, the horizontal or time scale being in each case the same. The displacement curve is indicated at 90 and the velocity variation by the dashed line 91. These are the curves corresponding to natural earth movement over the path of the desired reflection and do not pertain merely to the material in the weathered layer. Before discussing the curves, brief reference may be made to the procedure for determining the natural frequency of the earth over the reflection path, in other words, the frequency which is characteristic of the region under study.

To do this, both shot point and geophone spread are established and a test shot made without using filtering at the recording unit except for surface wave frequencies. Such shot is preferably made by firing one or more charges in the air. The resulting traces will be found to have a predominant period of vibration which may be read off directly merely by observing the distance (expressed in units of time) between adjacent peaks on a given trace. It will be found in practice that the period is not constant but varies somewhat from point to point along the trace. For maximum accuracy, therefore, the period is read from that portion of the trace which shows a desired reflection either clearly or indistinctly. If no reflections are indicated, the average period over a chosen range of depth may be used.

Once this period is known, it is possible by employing my teachings to vary the duration of the pressure pulse so that it lasts one-quarter as long. It is found that this forces the weathered layer to vibrate at the desired frequency even though such layer may be relatively unresponsive at such frequency. It will be assumed in Fig. 13 that the distance from the origin to a point 92 represents the natural period T read from the trace. Upon application of pressure the earth starts out from rest to a position of maximum displacement 93. During this time the velocity goes from zero to a maximum 94 at the quarter cycle point and then back to substantially zero as shown at 95.

Referring back to Fig. 12 which represents the desired pressure relationship, it will be noted that positive pressure exists at a high level for the interval of increasing velocity and slightly less than the interval of increasing displacement. The latter is a desirable condition since the earth once set in motion has inertia and will continue to move a small amount in the downward direction even though positive pressure is removed. After the point of maximum displacement is reached, two effects occur. In the first place, vacuum, by now well established as indicated at 88, tends to pull it back. Secondly, the earth being in a state of compression will tend to spring back to the original position indicated at 95. Since the velocity at the latter point is quite high, the earth will continue to travel, and assuming that the vacuum is sustained during the upward movement, the displacement will reach an upper maximum 96 after which it will again return to the initial state 92 thus completing a full wave or cycle. Such wave, well formed and with its frequency definitely established, proceeds downwardly through the weathered layer and into more dense layers where the wave may be more efficiently transmitted.

Having observed in Figs. 12 and 12a the optimum relation between duration of pressure pulse and natural period of earth movement, attention may next be given to the manner in which a pulse of proper duration is established. This may be done in a number of ways without departing from the invention. However, since the art is not sufficiently advanced to calculate the duration of pulse accurately, the desired information may be most conveniently found by a trial and adjustment technique. A pattern is set up using a pattern of 7 or 13 charges arranged as shown in Figs. 2 and 4 and spread from 10 to 20 feet apart. Each charge may consist of a cylinder from one to five pounds in weight and fired from the center. By using tourmaline pressure gauges distributed at the surface of the ground below the pattern and an oscillograph having a high paper speed, time-pressure records of the type shown in Fig. 12 may be obtained. A number of variables may then be adjusted one by one and patterns successively fired until the preferred duration of pressure is achieved and the desired duration of vacuum at least approximated. In general, increasing the size of the charge increases the magnitude and duration of both the pressure and vacuum. Increasing the spacing between charges increases the duration of the pressure but decreases its magnitude. With regard to height, increasing the height from 4 to 20 feet causes a decrease of both duration and magnitude with the change being particularly noticeable in the range of 8 to 15 feet. As another possible variant, moving the cap down from its central position has a tendency to decrease the duration while moving it up tends to increase the duration. Movement in either direction somewhat reduces the magnitude of the pressure applied to the earth.

Instead of using pickup devices and high speed oscillograph, the duration of the pressure pulse may be obtained by using high speed photography. For example, test balloons have been arranged along the earth at intervals below the pattern and the explosion recorded at 3000 frames per second. The arrival of the wave front and the duration of pressure may be readily ascertained merely by counting the frames inducing compression, and some idea of the duration of vacuum may be obtained by observing the length of time the balloon remains in its expanded condition. The above techniques are clearly applicable to various patterns of charges for example the in-line arrangement shown in Fig. 3. One skilled in the art will find no difficulty, using the teachings outlined herein, in varying the duration of the pressure from .002 second to .020 second corresponding to seismic frequencies in the range of 94 down to 9.4 which more than covers the conceivable useful range.

Typical charge arrangements for producing various durations of pressure pulse are given by way of example in the following table for a center-fired cylindrical charge consisting of 60% high velocity seismic gelatin:

| Charges | Wgt. | Dimensions | Spacing and Arrangement | Elevation | Pulse Duration | Corresponding Earth Frequency |
|---|---|---|---|---|---|---|
| | Pounds | Inches | | Feet | Seconds | |
| 5 | 4.1 | 2¼ x 22 | 20′ in line | 8 | .009 | 25 |
| 5 | 4.1 | 2¼ x 22 | 10′ in line | 12 | .006 | 40 |
| 5 | 4.1 | 2¼ x 22 | do | 8 | .007 | 33 |
| 5 | 4.1 | 2¼ x 22 | 20′ in line | 12 | .008 | 31 |
| 7 | 2.05 | 2¼ x 11 | 30′ hex | 8 | .007 | 36 |
| 7 | 4.1 | 2¼ x 22 | 30′ hex | 8 | .006 | 46 |
| 13 | 4.1 | 2¼ x 22 | 20′ star | 6 | .006 | 40 |
| 13 | 4.1 | 2¼ x 22 | 30′ star | 6 | .006 | 46 |

As will be abundantly clear from the above, I prefer that the pressure pulse be sustained for a full quarter cycle. This assumes that the total charge is kept quite low as it will be in the interest of economy. Normally it is possible to get by with much less explosive than is required for hole shooting. If the amount of explosive is considerably increased the impulse applied to the earth will be correspondingly increased and it will be found that best results will be obtained by shortening the duration to less than one-quarter, say about three-sixteenths, of the earth's period. Unless this is done the earth may over-travel considerably in the downward direction and the period lengthened beyond that which is most effectively transmitted.

It will be clear to one skilled in the art that the pressure pulse sequence outlined above is much slower than that which occurs when employing the shock wave as such to set up a seismic wave in the earth and, therefore, does not require nearly the same degree of precision in the timing of the various charges in the pattern. Even where there is a difference of timing of a full millisecond, this has no adverse effect on the flatness of the wave front. It merely affects the horizontal position at which the colliding wave fronts meet. Any resulting irregularity in the wave front is equalized or averaged out as the wave travels downwardly through the earth. As a consequence, accurate firing presents no particular problem.

Because of the positive push-pull thrust applied to the earth timed with the natural frequency of the earth, the energy received by the geophones is well defined with a minimum of random frequencies and random phase relations. Since first arrivals are of a very low amplitude the automatic volume control or the expander circuit conventionally used can easily handle the full range of energy levels without the use of a pre-set suppresser. Uniform records have been made using recording units not equipped with automatic volume control or expander.

The present charge and method of use thereof give rise broadly to the same advantages which have been fully discussed in the applications filed concurrently herewith and my earlier copending applications Ser. No. 11,613, filed February 27, 1948, and Ser. No. 29,307, filed May 26, 1948. The energy of the explosion is not concentrated over a very small area as it is in the conventional shot hole method but instead is conveyed elastically in the air and applied over the extended area occupied by the pattern. The wastage of energy as a result of the crushing effect encountered in shot holes is completely avoided. While it is true that some energy is dissipated upwardly into the atmosphere and some is reflected from the earth, the energy entering the earth is concentrated into such a narrow frequency range that even a moderate impulse is sufficient to produce satisfactory reflections. Furthermore, the energy which is transferred to the earth is applied at such a reduced intensity level that efficient transmission through the loose weathered layer is assured. The method thus makes use of the inherent wave transmission properties of granules as fully discussed in my prior applications. Inverse square loss is minimized, particularly during the early or critical part of the travel of the wave through the weathered layer. The energy proceeds through the weathered layer in the form of a rather well-defined beam and is directed downward to such an extent that extraneous reflections from sub-surface irregularities lying to one side of the area of interest are reduced to a minimum.

The transmission of a selected frequency or band of frequencies which is inherent in the present device has already been alluded to. It will be helpful however to refer briefly to conventional practice for purposes of comparison. The practice today is to generate by means of the explosive in a shot hole almost the complete spectrum of supersonic, sonic, and low seismic frequencies with a distribution of energy distributed primarily in the unusable frequencies above and below the readily transmitted band. Then by means of a series of filter systems an attempt is made to remove the undesirable frequencies from the incoming signal. This would not be so difficult if the earth's crust through which the energy passes were a homogeneous medium, but due to its extreme non-uniformity in any one stratum, to say nothing of the variations with depth, the more readily transmitted frequencies are so badly distorted in phase and wave form that alinement of reflected energies which have traversed different paths is frequently difficult if not impossible, even though a great deal of mixing or compositing is used on the strongly filtered signal. The preponderance of energy in the high and low frequencies and its subsequent absorption contributes to the distortion of the signal.

Figure 13:
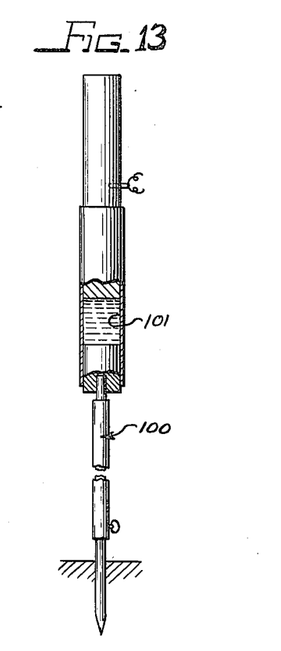
Fig. 13 shows a modified charge assembly including a vaporizable liquid.
Figure 14:
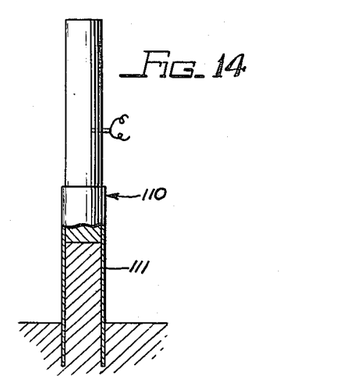
Fig. 14 is another modification which may be employed under certain conditions where firing poles are not available.

Attention is next drawn to modified forms of charge assembly which may be employed as shown in Figs. 13 and 14. In the embodiment of Fig. 13 the charge assembly indicated at 100 includes a cylindrical container 101 filled with water or other fluid substance capable of being vaporized. The water not only serves to inhibit downward transmission of initial shock wave but is immediately vaporized thereby augmenting the volume of high temperature gas which is created by the explosion.

In the modification of Fig. 14 the charge assembly 110 includes a paper coupler tube 111 filled with earth or sand which is placed directly on the ground. While the arrangement disclosed in Fig. 14 does not possess all the advantages discussed in connection with the preceding modifications, nevertheless it is of some utility where the earth is relatively level and where supporting posts 22 are not readily available.

While I prefer to fire the cylindrical charges from the center it will be understood that the invention is not necessarily limited thereto. Satisfactory results have also been obtained when the charges are fired from the upper end. The main difference is that firing at the center produces greater lateral direction of explosive energy in the form of expanding gas than firing at any other position within the charge. It will also be understood that while I prefer to employ a wood block or the like to shield the lower ends of the charges to reduce the downwardly traveling shock wave, satisfactory records may be obtained in many cases even when this block is eliminated and the charges are impaled on a thin, axially arranged, dowel. Also, if desired, the charges may be made shorter than illustrated without departing from the invention in its broader aspects.

Regardless of which of the modifications is used, the usual shot hole drilling equipment and accessories are entirely eliminated. This feature offers exceptional advantages in foreign countries as well as in other areas which are difficult to reach with heavy equipment. Since no drilling equipment is needed, the operating procedure is made more flexible and fast moving, and the shooting party can work more closely, or even be combined, with the surveying party. If it is found that additional shot points are desired, they can be introduced without having each of the three groups return to that point. Several shots can be made at the same point with perfect reproducibility and without encountering what is known as hole fatigue wherein successive records differ widely even though identical charges are loaded in exactly the same manner in a shot hole.

Test shots made in cultivated areas show that very little permanent damage is incurred by the plant life on the surface immediately below the elevated charges. Experiments to date employing the techniques disclosed herein for underwater prospecting indicate that no damage to fish and marine life results from the energy set up in the water by detonating the charges suspended above the water by floating buoys. While the noise is somewhat greater than accompanies the firing of an equivalent amount of charge in the ground, nevertheless the possibility of damage to buildings and other structures is much less than that caused by the shear wave or "ground roll" in conventional shooting techniques.

From an economic standpoint the savings in time and cost to drill shot holes ahead of the seismograph crews, together with the elimination of the drilling and accessory equipment, enable the cost per mile of subsurface information to be reduced substantially below that incurred in the past.

While the invention has been discussed in connection with reflection shooting it will be appreciated by one skilled in the art that it is also applicable to refraction shooting in which the geophones are spaced at a much greater distance from the shot point. For refraction shooting, however, I prefer to use the pattern of charges shown in Fig. 3 in which the charges are arranged along a line which is at right angles to the geophone spread. This pattern tends to concentrate the energy in a vertical plane perpendicular to the line of charges.

I claim as my invention:

1. The method of seismic exploration which includes the steps of adjusting the size and arrangement of explosive charges spaced above the surface of the earth so that upon firing thereof a downward force is first applied to the earth for a duration of about $\frac{3}{16}$ to about $\frac{1}{4}$ of the natural period of the earth's vibration in the region under study followed immediately by an upward tug of vacuum of a duration of approximately one-half of the natural period of the earth's vibration, arranging geophones at such distance from the explosive so that the desired reflections are received prior to the arrival of the air wave from the explosive charges, detonating the explosive charges simultaneously to set up a well-defined seismic wave in the surface layer of the earth, and then receiving such wave after it has been reflected from a submerged horizon.

2. The method of seismic exploration which includes the steps of observing the period of seismic disturbance most readily transmitted by the earth in the region under study, so proportioning and arranging explosive charges above the surface of the earth that upon firing thereof the duration of the resulting gas pressure on the earth is substantially one-quarter of such period, firing the explosive charges simultaneously, and then receiving the seismic disturbance resulting therefrom after it has been transmitted through the earth.

3. The method of seismic exploration which includes the steps of making a sample seismogram using a recording unit capable of receiving a wide band of frequencies, observing the period of seismic disturbance at a point along the length of the seismogram which corresponds to a depth of interest, so proportioning and arranging explosive charges above the surface of the earth that upon firing thereof the duration of the resulting gas pressure on the earth is in the range from about three-sixteenths to about one-quarter of such period, firing the explosive charges simultaneously, and then receiving the seismic disturbance resulting therefrom after it has been transmitted through the earth.

4. The method of seismic exploration which includes the steps of observing the period of seismic disturbance most readily transmitted by the earth in the region under study, setting up a pattern of explosive charges elevated above the surface of the earth of such size and so arranged that upon firing thereof the duration of the resulting gas pressure on the earth is approximately one-quarter of such period, exploding such charges simultaneously to produce a generally flat seismic wave in the earth, and then receiving said seismic wave after it has been transmitted through the earth.

5. The method of seismic exploration which includes the steps of observing the period of seismic disturbance most readily transmitted by the earth in the region under study, setting up a pattern of explosive charges elevated above the surface of the earth of such size and so arranged that upon firing thereof the duration of the resulting gas pressure on the earth is approximately one-quarter of such period, setting up a geophone spread at such distance from the pattern so that any reflection of interest arrives at the geophones prior to the air wave from the pattern, exploding such charges simultaneously to produce a generally flat wave front in the earth, and then receiving said wave front after it has been transmitted through the earth.

6. The method of seismic exploration which comprises observing the period of seismic disturbance most readily transmitted by the earth in the region under study, arranging a pattern of vertical charges above the surface of the earth with the charges of such size and with the spacing and elevation such that upon firing thereof the duration of the resulting gas pressure on the earth is substantially one-quarter of such period, exploding the charges simultaneously, and then receiving the seismic disturbance resulting therefrom after it has been transmitted through the earth.

7. The method of seismic exploration which includes the steps of adjusting the size and arrangement of explosive charges above the surface of the earth so that upon firing thereof a downward pressure is first applied to the earth for a duration substantially equal to one-quarter of the natural period of the earth vibration in the region under study followed immediately by vacuum, firing said explosive charges simultaneously so that the earth is subjected first to pressure and then to vacuum in timed sequence to set up a well defined wave front therein, and then receiving such wave front after it has been transmitted through the earth.

8. A charge array for producing a pressure pulse substantially simultaneously over an extended area of the earth's surface comprising, in combination, a plurality of long cylindrical charges arranged vertically above the earth and spaced substantially equidistant from one another, each of the said charges having a support of inert material extending across the lower end thereof for inhibiting the passage of the initial shock wave in the direction of the earth, and means including supporting posts coaxially arranged with respective ones of said charges for engaging said supports.

THOMAS C. POULTER.

REFERENCES CITED

The following references are of record in the file of this patent:

UNITED STATES PATENTS

| Number | Name | Date |
|---|---|---|
| Re. 17,242 | McCollum | June 5, 1928 |
| 2,203,140 | Green | June 4, 1940 |
| 2,340,314 | Farnham | Feb. 1, 1944 |
| 2,426,997 | Gray | Sept. 9, 1947 |
| 2,420,672 | Maillet | May 20, 1947 |

FOREIGN PATENTS

| Number | Country | Date |
|---|---|---|
| 701,747 | France | Mar. 21, 1931 |

OTHER REFERENCES

Tsvetaev (USSR), "An Experiment of Application of Air Explosions in Reflection Exploration"; article in "Applied Geophysics," 1945, No. 1, pages 82–87. (Copy in 181–0.53B.)